(12) United States Patent
Koike et al.

(10) Patent No.: US 6,374,961 B1
(45) Date of Patent: Apr. 23, 2002

(54) TUBE-PRESSED BRAKE

(75) Inventors: Yasuhito Koike; Satoshi Dairokuno; Yoshio Kinoshita, all of Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/449,620

(22) Filed: Nov. 30, 1999

(30) Foreign Application Priority Data

Nov. 30, 1998 (JP) .......................................... 10-338878

(51) Int. Cl.$^7$ .............................................. F16D 51/00
(52) U.S. Cl. ...................................................... 188/77 R
(58) Field of Search ............................. 188/77 R, 77 W

(56) References Cited

U.S. PATENT DOCUMENTS

| 4,509,730 | A | * | 4/1985 | Shtarkman | ................... | 207/35 |
| 5,086,899 | A | | 2/1992 | Latsko | | |
| 6,016,841 | A | * | 1/2000 | Larsen | ......................... | 138/30 |
| 6,089,358 | A | * | 7/2000 | Dairokuno | ................... | 188/74 |

FOREIGN PATENT DOCUMENTS

| JP | 35-26215 | 10/1960 |
| JP | 61099625 A | 5/1986 |
| JP | 63267164 A | 11/1988 |
| JP | 02311268 A | 12/1990 |
| JP | 06240303 A | 8/1994 |

* cited by examiner

Primary Examiner—Matthew C. Graham
(74) Attorney, Agent, or Firm—Crowell & Moring LLP

(57) ABSTRACT

A tube-pressed brake includes a tube for being injected with a pressure fluid to produce a pressure therein to permit transmission of a torque between two members arranged in a combination and rotating relative to each other. The tube has been applied with a coating.

8 Claims, 8 Drawing Sheets

APPLY SIDE　　　　　　　　　　　ANCHOR SIDE

APPLY SIDE                    ANCHOR SIDE

ANCHOR SIDE

TUBE-PRESSED BRAKE

BACKGROUND OF THE INVENTION a) Field of the Invention

This invention relates to a tube-pressed brake suitable for use in a clutch or brake of an automatic transmission, construction machinery, agricultural machinery or the like.

b) Description of the Related Art

FIG. 1 is a cross-sectional view, as viewed from the front, of a tube-pressed brake before the present invention is applied. A tube 1 is arranged on and along an inner periphery of an outer frame 2, and is folded back at opposite end portions thereof. Folded portions 3 are fixed on the outer frame 2 by presser plates 4 and rivets 5, respectively. Designated at numeral 7 is a pressure fluid supply hole formed through the outer frame 2 to inject a pressure fluid into the tube. Numeral 7 indicates an opening of the outer frame 2. The tube 1 is folded back at the opposite end portions thereof over edge portions of the opening 7, respectively. Incidentally, a counterpart member to be bound is located inside the tube 1 although this counterpart member is not illustrated in the drawing.

Rubber or the like is primarily used as the material of the tube of the tube-pressed brake. Conventionally, such rubber-made tubes have been used as they are.

A tube for use in a tube-pressed brake is desired to be equipped with improved heat resistance, strength and friction characteristic and also with improved basic performances for the prevention of occurrence of drag torque and the prevention of leakage of a pressure fluid. Conventional tubes, which make use of rubber or the like as they are, are however not fully satisfactory in this respect.

SUMMARY OF THE INVENTION

With the foregoing in view, the present invention has as an object the provision of a tube-pressed brake in which a tube is improved in such properties and performances.

As a result of extensive research, the present inventors have found that the above object of the present invention can be achieved by applying a coating to the tube.

In one aspect of the present invention, there is thus provided a tube-pressed brake comprising a tube for being injected with a pressure fluid to produce a pressure therein to permit transmission of a torque between two members arranged in a combination and rotating relative to each other, wherein the tube has been applied with a coating. The coating may be applied on either an inner wall or outer wall of-the tube. The tube-pressed brake may further comprises a circular frame member wits an opening formed therethrough, wherein the tube is folded back at opposite end portions thereof over edges of the opening, respectively, such that the tube is held in place on the frame member, and the tube has been applied with coatings at respective folded portions thereof.

Owing to the provision of the coating, the tube-pressed brake according to the present invention can prevent the tube from coming into contact with a counterpart member, which would otherwise take place as the tube may slack and fail to retain its shape when the tube-pressed brake is released. The coating can also prevent leakage of the pressure fluid. In addition, the coating makes it possible to adjust friction characteristics of the tube. The tube-pressed brake is therefore equipped with improved heat resistance and strength.

DETAILED DESCRIPTION OF THE INVENTION AND PREFERRED EMBODIMENTS

Application of a coating over an entire outer or inner wall of a tube of a tube-pressed brake can prevent leakage of a pressure fluid and, while the tube-pressed brake is not actuated with the pressure fluid drawn out of the tube, can prevent slacking of the tube and hence occurrence of a drag torque. Application of a coating on a frictionally engaging surface of the outer wall of a tube makes it possible to adjust the friction characteristics of the tube. Further, coating of the friction surface of a tube with a resin or the like having excellent heat resistance or conversely, omission of a coating only at certain locations of a tube where heat resistance is required and feeding of a lubricating oil over such locations can improve the heat resistance of the tube.

In addition, reinforcement of a tube at certain weak locations by coatings can improve the strength of the tube. Further, application of coatings to a tube at portions thereof folded back over edges of an opening in an outer frame can also enhance the strength of the tube.

Preferred examples of a coating material suitable for the attainment of the object of the present invention can include fluorinated resins, phenol resins, and silicone resins.

Referring next to FIGS. 2 through 28 of the accompanying drawings, preferred embodiments of the present invention will hereinafter be described.

Figure 2:
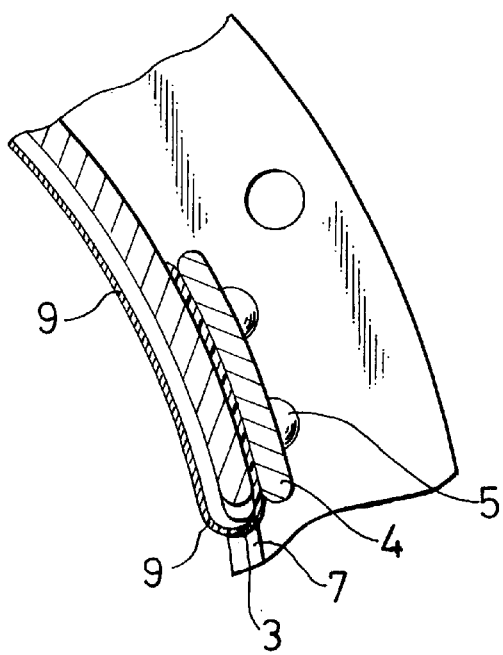
FIG. 2 corresponds to an enlarged view of a portion indicated by a circle D of FIG. 1, and is a fragmentary cross-sectional view of a tube-pressed brake according to a first embodiment of the present invention.
Figure 3:
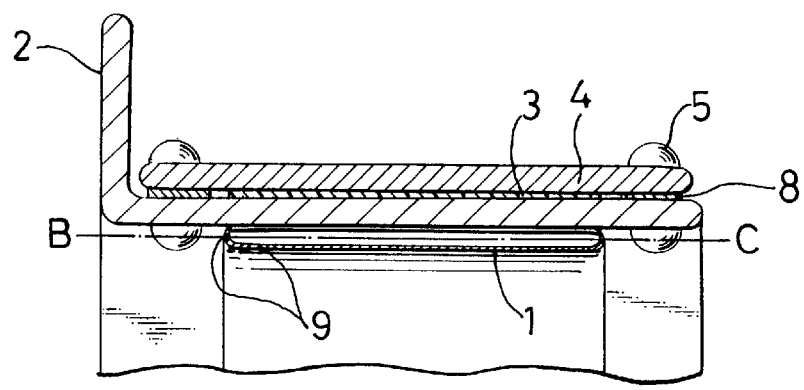
FIG. 3 corresponds to an cross-sectional view taken along line A–O of FIG. 1, and is a fragmentary cross-sectional view of the tube-pressed brake according to the first embodiment of the present invention.
Figure 4:
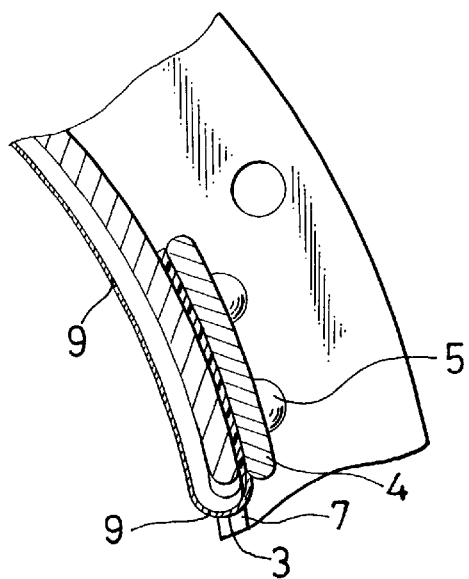
FIG. 4 corresponds to an enlarged view of a portion indicated by a circle D of FIG. 1, and is a fragmentary cross-sectional view of a tube-pressed brake according to a second embodiment of the present invention;, FIG. 5 corresponds to an cross-sectional view taken along line A–O of FIG. 1, and is a fragmentary cross-sectional view of the tube-pressed brake according to the second embodiment of the present invention.

The first embodiment of the present invention will be described first with reference to FIGS. 2 and 3, in which like reference numerals as in FIG. 1 indicate like elements of structure. In FIG. 3, numeral 8 indicates a spacer arranged between the outer frame 2 and the presser plate 4. In the first embodiment, a tube 1 is applied on an inner wall thereof with a coating 9. The term "inner wall" as used herein means a wall of the tube where the tube is brought into contact with a pressure fluid.

When a torque of a counterpart member (not shown) arranged on an inner side of the tube is transmitted to the tube upon actuation of the brake, the coating 9 reinforces the folded portion 3 on which a load concentrates. Further, the coating 9 can prevent the tube 1 from failing to retain its shape when the pressure fluid is drawn out of the tube 1 to release the brake, and during idling, the coating 9 can prevent the tube 1 from coming into contact with the counterpart member, thereby making it possible to avoid occurrent of a drag torque. Moreover, the coating 9 can prevent leakage of the pressure fluid during actuation of the brake.

Reference will next be had to FIGS, 4 and 5 to describe the second embodiment of the present invention. In these drawings, like reference numerals as in FIG. 1 indicate like elements of structure. In the second embodiment, a tube 1 is applied on an outer wall thereof with a coating 9. The term "outer wall" as used herein means the outer wall of the tube, which is located on a side opposite to the above-described inner wall. Upon actuation of the brake, the outer wall, on an inner side thereof as viewed in a radial direction of the tube-pressed brake, is therefore brought into frictional contact or engagement with the counterpart member. In addition to the advantage described above with respect to the first embodiment, the second embodiment can make full use of the friction characteristics of the coating material of the coating.

Figure 5:
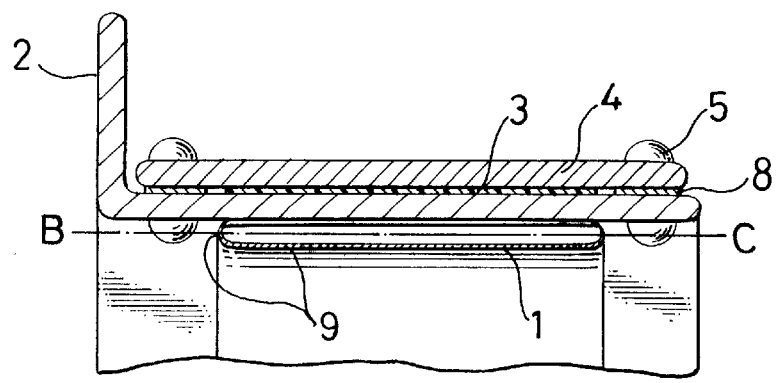
Figure 6:
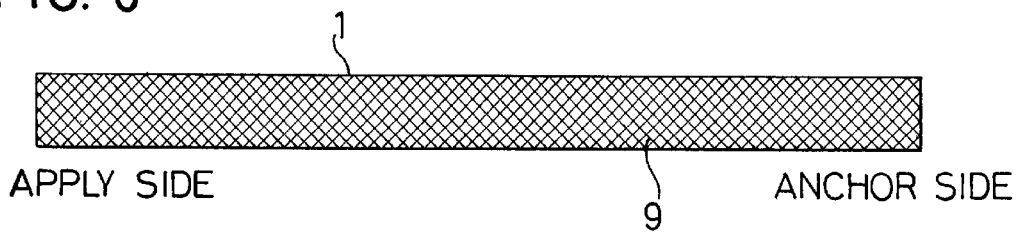
FIG. 6 is a development of a tube, showing an example of coating.
Figure 7:
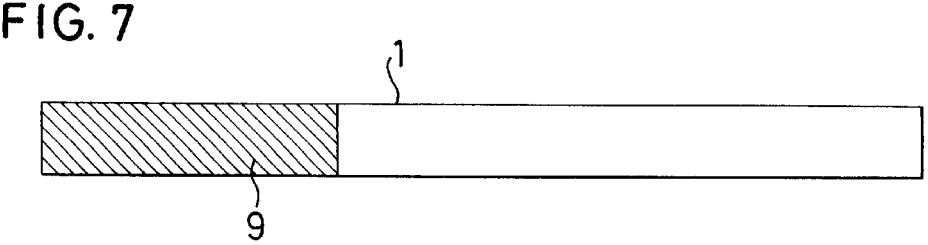
FIG. 7 is a development of another tube, showing another example of coating.

FIG. 6 through FIG. 24 correspond to a cross-sectional view taken along line B–C of FIG. 3 or FIG. 5. Coatings actually applied on inner walls or outer walls of tubes 1 are shown in developed forms. Cross-hatched or hatched areas indicate coatings 9 applied on the inner walls or outer walls of the tubes 1 as applied at selected areas. Application of a coating only at selected area or areas as in FIG. 7 through FIG. 28 can adjust friction characteristics, can use lubricity of a cooling oil, or can improve the strength or heat resistance at such selected area or areas.

Figure 17:
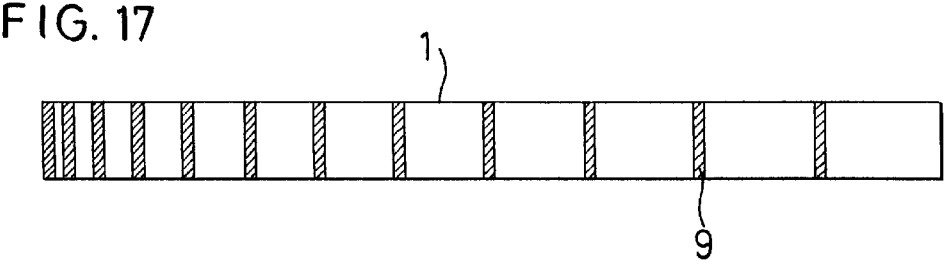
FIG. 17 is a development of a still further tube, showing a still further example of coating.
Figure 18:
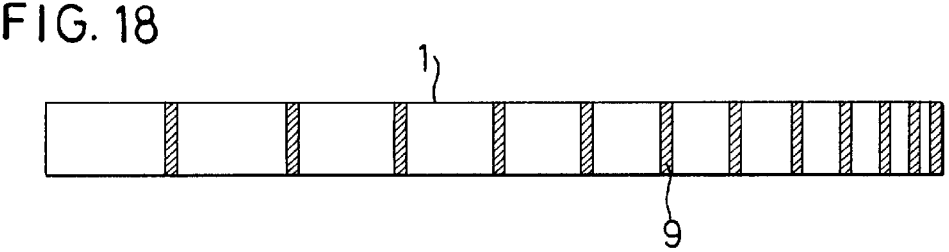
FIG. 18 is a development of a still further tube, showing a still further example of coating.
Figure 19:
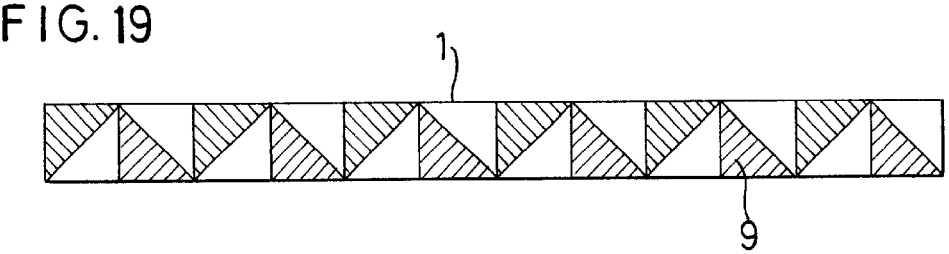
FIG. 19 is a development of a still further tube, showing a still further example of coating.
Figure 20:
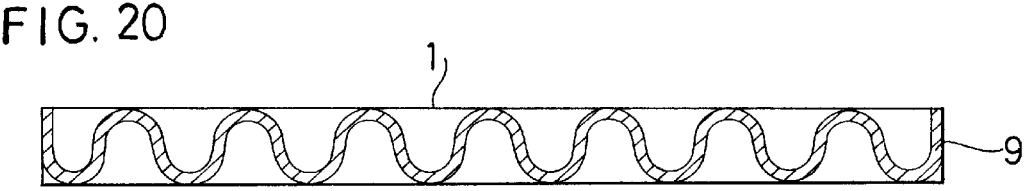
FIG. 20 is a development of a still further tube, showing a still further example of coating.

From the viewpoint of an adjustment of friction characteristics, the partial coatings of FIG. 17 and FIG. 18 can show excellent advantageous effects. In the tube-pressed brake according to the first or second embodiments, a self-engaging force is developed. Torques to be borne at the opposite end portions of the tube therefore vary depending on the direction of rotation. In the present invention, the end portion which bears a greater torque capacity is called an "anchor side" while the end portion which bears a smaller torque capacity is called an "apply side". For example, the frictionally engaging surface of a tube tends to undergo more severe wearing on the anchor side. One may therefore want to lower the coefficient of friction slightly on the anchor side. If the coefficient of friction is lower at a coated area than at an uncoated area, it is effective to apply a coating as shown in FIG. 18. If the coefficient of friction is higher at a coated area than at an uncoated area, on the contrary, it is effective to apply coating conversely as depicted in FIG. 17.

Figure 8:
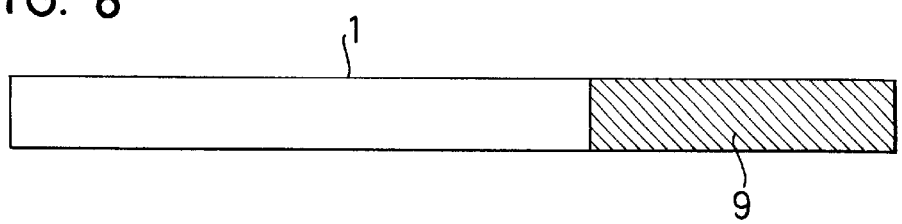
FIG. 8 is a development of a further tube, showing a further example of coating.
Figure 9:
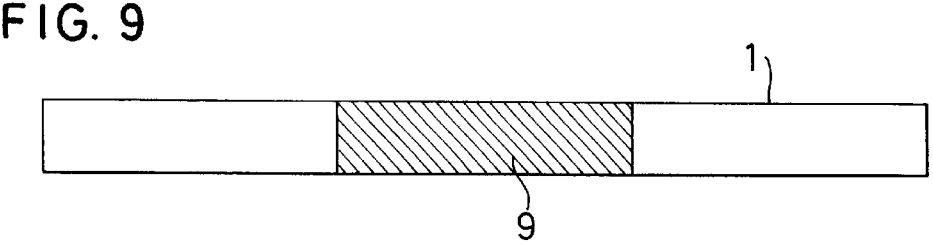
FIG. 9 is a development of a still further tube, showing a still further example of coating.
Figure 10:
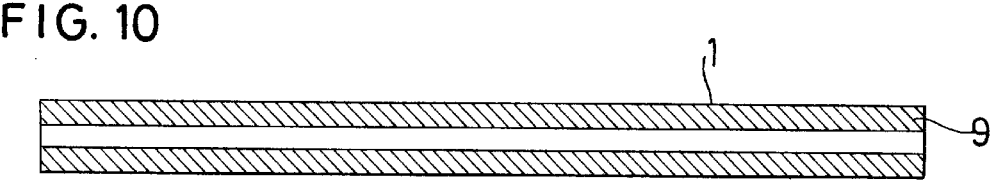
FIG. 10 is a development of a still further tube, showing a still further example of coating.
Figure 11:
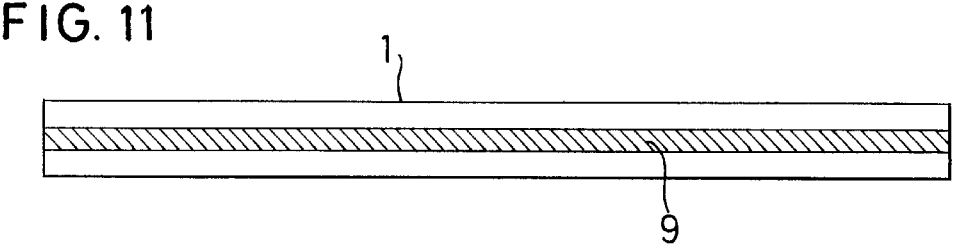
FIG. 11 is a development of a still further tube, showing a still further example of coating.
Figure 12:
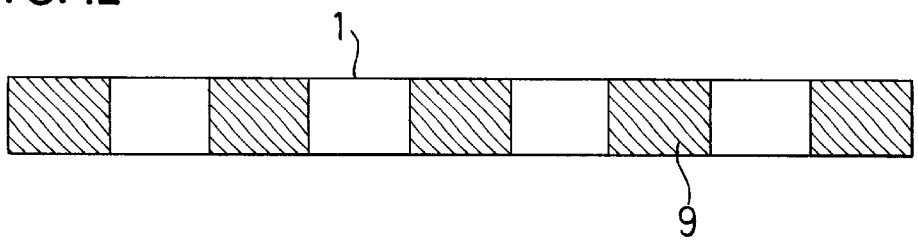
FIG. 12 is a development of a still further tube, showing a still further example of coating.
Figure 13:
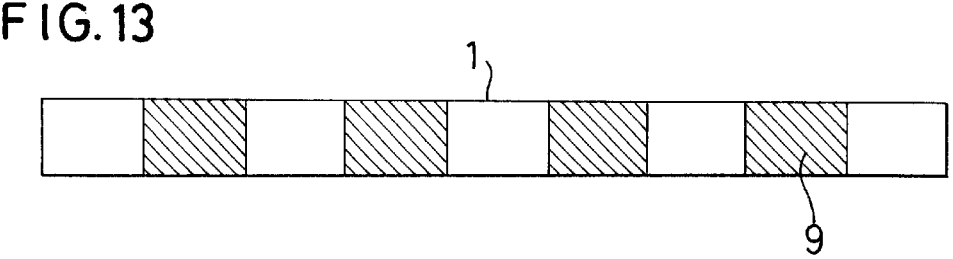
FIG. 13 is a development of a still further tube, showing a still further example of coating.
Figure 14:
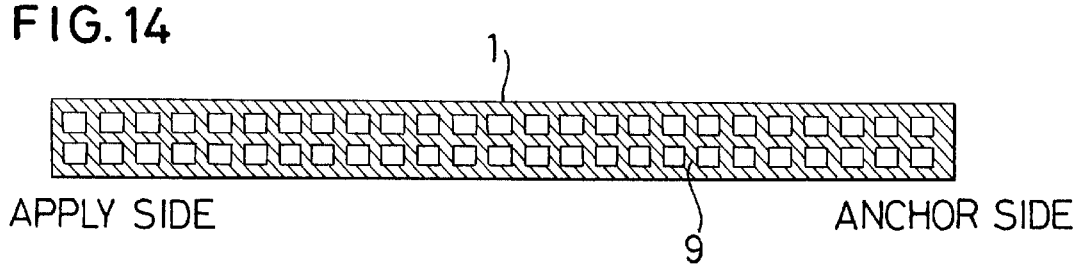
FIG. 14 is a development of a still further tube, showing a still further example of coating.
Figure 21:
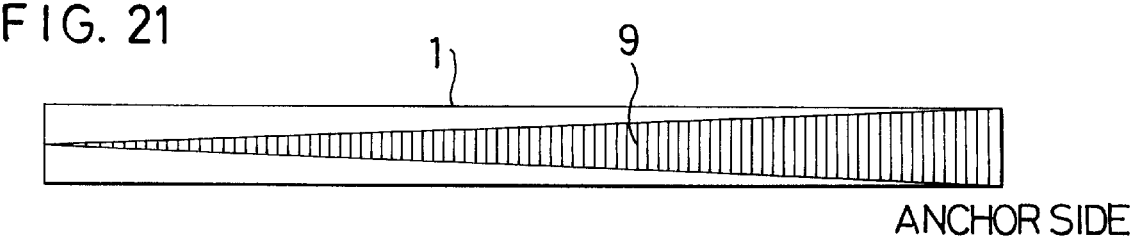
FIG. 21 is a development of a still further tube, showing a still further example of coating.
Figure 22:
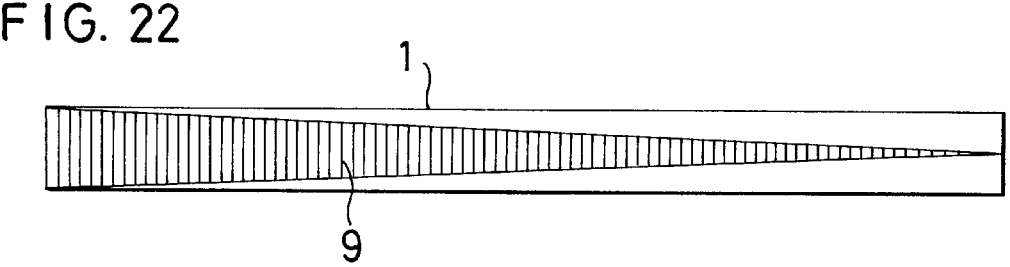
FIG. 22 is a development of a still further tube, showing a still further example of coating.
Figure 23:
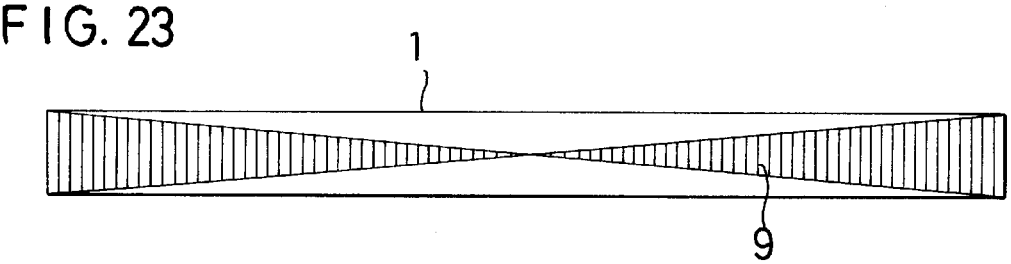
FIG. 23 is a development of a still further tube, showing a still further example of coating.
Figure 24:
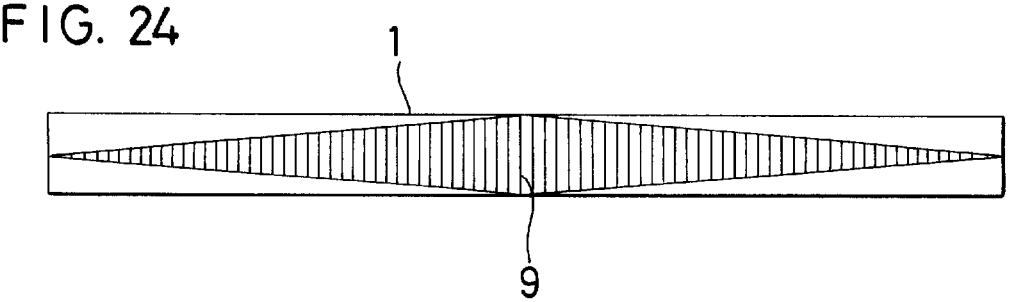
FIG. 24 is a development of a still further tube, showing a still further example of coating.

Concerning strength or heat resistance, it is also often required to provide sufficient strength or heat resistance on the anchor side. In such a case, a tube with a coating applied on the anchor side as shown in FIG. 8 or FIG. 21 is effective.

Figure 15:
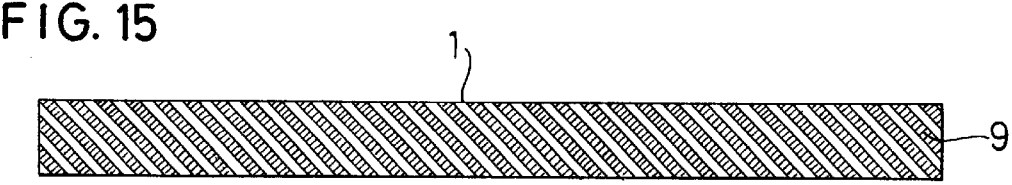
FIG. 15 is a development of a still further tube, showing a still further example of coating.
Figure 16:
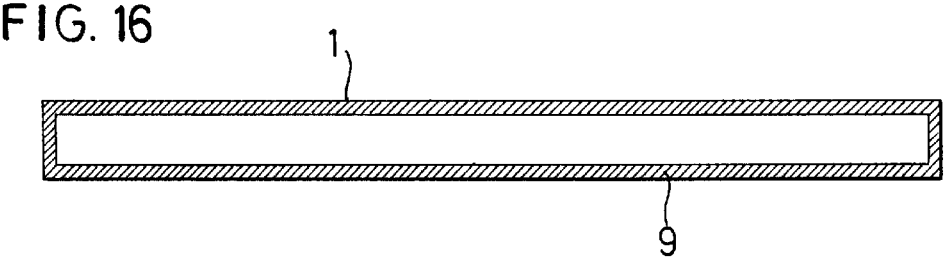
FIG. 16 is a development of a still further tube, showing a still further example of coating.

To improve the heat resistance of a tube by making use of lubricity of a cooling oil, it is effective to apply a coating at an angle relative to the direction of rotation of a counterpart member as illustrated in FIG. 15 so that spreading of the oil throughout the tube can be facilitated.

In FIG. 6 through FIG. 24, the tubes are each illustrated in such a direction that the apply side thereof is on the left side and the anchor side thereof is on the right side.

Figure 25:
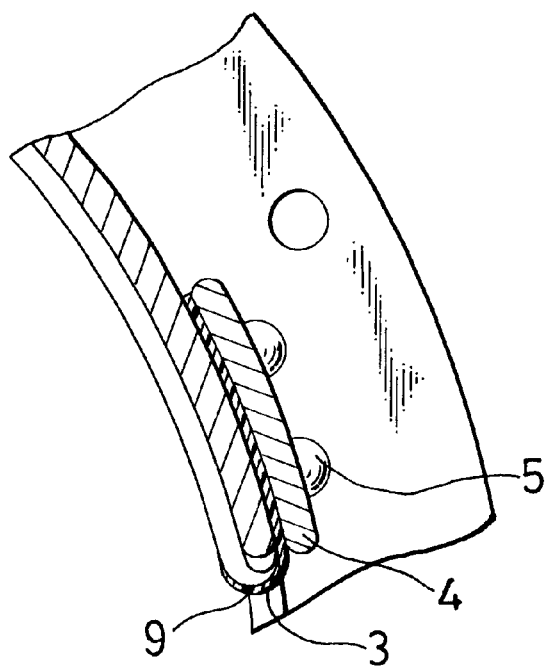
FIG. 25 corresponds to an enlarged view of a portion indicated by a circle D of FIG. 1, and is a fragmentary cross-sectional view of a tube-pressed brake according to a third embodiment of the present invention.
Figure 26:
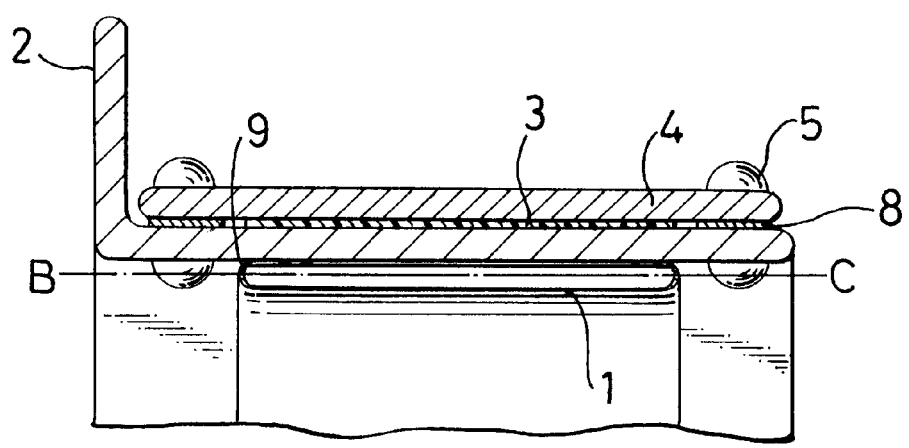
FIG. 26 corresponds to an cross-sectional view taken along line A–O of FIG. 1, and is a fragmentary cross-sectional view of the tube-pressed brake according to the third embodiment of the present invention.

With reference to FIG. 25 and FIG. 26, the third embodiment of the present invention will now be described. In these drawings, like reference numerals as in FIG. 1 indicate like elements of structure. A tube 1 repeats expansion and contraction, so that fatigue accumulates at side portions. The tube 1 therefore unavoidably becomes weak at the side portions thereof. To cope with this problem, meshes may be incorporated as reinforcements in such side portions. A pressure fluid, however, tends to leak out through the mesh-reinforced side portions. This problem can be solved by applying coatings to the side portions of the tube as illustrated in FIG. 3.

Figure 27:
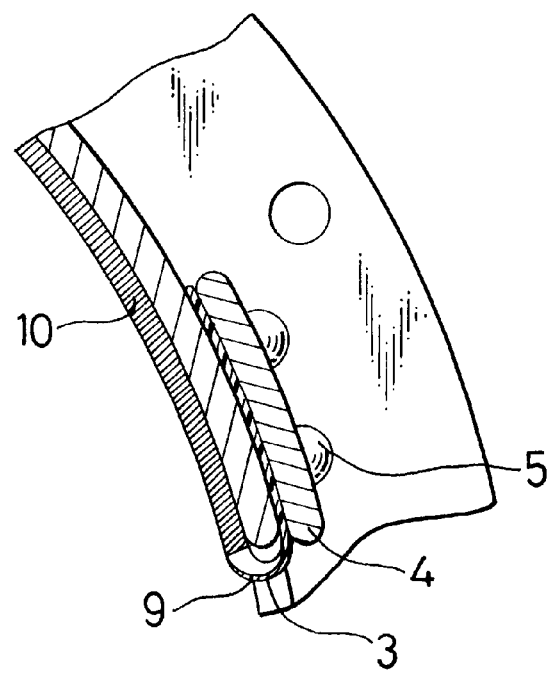
FIG. 27 corresponds to an enlarged view of a portion indicated by a circle D of FIG. 1, and is a fragmentary cross-sectional view of a tube-pressed brake according to a fourth embodiment of the present invention.
Figure 28:
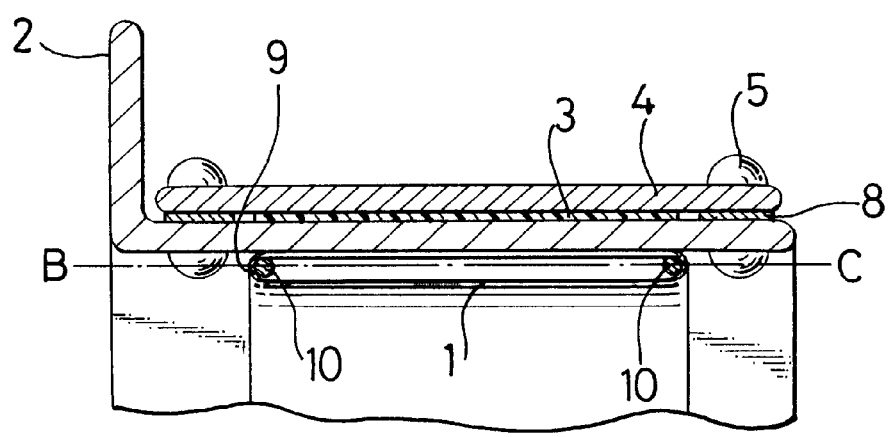
FIG. 28 corresponds to an cross-sectional view taken along line A–O of FIG. 1, and is a fragmentary cross-sectional view of the tube-pressed brake according to the fourth embodiment of the present invention.

Referring next to FIG. 27 and FIG. 28, the fourth embodiment of the present invention will be described.

Figure 1:
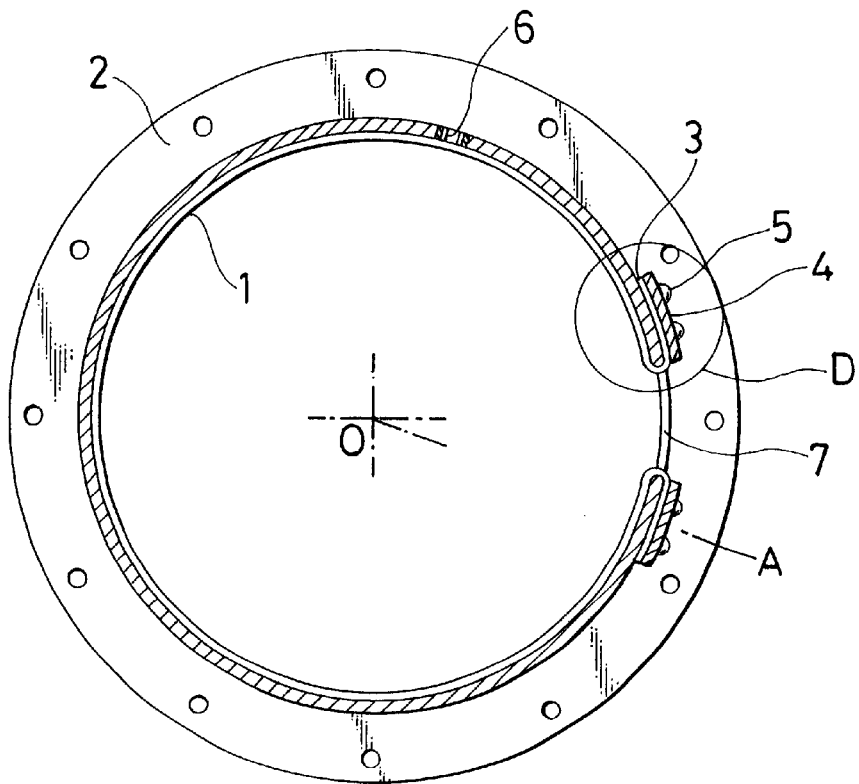
FIG. 1 is a cross-sectional view, as viewed from the front, of a tube-pressed brake to which the present invention can be applied.

In these drawings, like reference numerals as in FIG. 1 indicate like elements of structure. Where a tube 1 itself has good friction characteristics and is also resistant to wearing, application of a coating to its frictionally engaging surface may conversely deteriorate the friction characteristics. According to the fourth embodiment, a coating is therefore applied at locations other than the frictionally engaging surface. Owing to the coating so applied, the tube 1 can retain its shape during a release of the tube-pressed brake, the side portions of the tube 1 can be prevented from oil leakage and can also be reinforced, and the frictional performance of the tube 1 itself can be fully utilized.

Depending on the kind of the coating material or in the case of a coating like that depicted in FIG. 27, the tube cannot retain its shape when a pressure is drawn out of the tube as in the case of the release of the tube-pressed brake according to the second embodiment. In the fourth embodiment shown in FIG. 27 and FIG. 28, a spring 10 such as a helical spring is arranged inside the tube 1 to urge it such that the tube 1 is stretched outwards to prevent it from failing to retain its shape.

This application claims the priority of Japanese Patent Application No. HEI 10-338878 filed Nov. 30, 1998, which is incorporated herein by reference.

What is claimed is:

1. A tube-pressed brake comprising a tube for being injected with a pressure fluid to produce a pressure therein to permit transmission of a torque between two members arranged in a combination and rotating relative to each other, wherein said tube has an applied coating on a surface of the tube, said coating being a resin-based coating.

2. A tube-pressed brake according to claim 1, wherein said applied coating has been applied only on an inner wall of said tube in order to prevent the tube from failing to retain its shape when the pressure fluid is drawn out of the tube.

3. A tube-pressed brake according to claim 1, wherein said applied coating has been applied only on an outer wall of said tube.

4. A tube-pressed brake according to claim 1, further comprising a circular frame member with an opening formed therethrough, wherein said tube is folded back at opposite end portions thereof over edges of said opening, respectively, such that said tube is held in place on said frame member, and said tube has said applied coatings at respective folded portions thereof.

5. A tube-pressed brake comprising a tube for being injected with a pressure fluid to produce a pressure therein to permit transmission of a torque between two members arranged in a combination and rotating relative to each other, wherein said tube has an applied coating on a surface of the tube, and wherein said tube includes a radially inner surface and said applied coating is applied to only a portion of the radially inner surface.

6. A tube-pressed brake comprising a tube for being injected with a pressure fluid to produce a pressure therein to permit transmission of a torque between two members arranged in a combination and rotating relative to each other, wherein said tube has an applied coating on a surface of the tube, and wherein said tube includes a radially inner surface and said applied coating is applied to only at least one portion of the radially inner surface in order to adjust friction characteristics of said at least one portion.

7. A tube-pressed brake comprising a tube for being injected with a pressure fluid to produce a pressure therein to permit transmission of a torque between two members arranged in a combination and rotating relative to each other, wherein said tube has an applied coating on a surface of the tube, said coating being a resin-based coating, and wherein said tube includes an interior surface and said applied coating is applied to only at least one portion of the interior surface.

8. A tube-pressed brake comprising a tube for being injected with a pressure fluid to produce a pressure therein to permit transmission of a torque between two members arranged in a combination and rotating relative to each other, wherein said tube has an applied coating on a surface of the tube, and wherein said tube includes a side portion and said applied coating is applied to only the side portion of the tube.

* * * * *